Patented Jan. 13, 1942

2,269,509

UNITED STATES PATENT OFFICE 2,269,509

PLASTIC COMPOSITION

Michael J. Batelja, Portland, Oreg.

No Drawing. Application March 5, 1938,
Serial No. 194,177

1 Claim. (Cl. 106—150)

This invention relates to improvements in plastic materials, and has particular reference to an improved composition which may be applied as a wall surfacing or coating similar to plaster or stucco, or which may be cast into shapes and sizes for use as wall board, insulation and the like.

More particularly, the invention relates to a new and improved process of compounding a plastic material which can be cheaply manufactured of inexpensive by-product materials, and which will produce a hard, tough article adapted for use as interior or exterior surfaces, or as wall board, or as an insulating material for use in refrigerators, or for acoustical purposes and the like.

It is an object of the invention to provide a process for making a low cost plastic building material for use as plaster for interior walls, or in the place of stucco for exterior surface, and which can be cast or molded in various shapes and designs for imitating bricks, shakes, tiles, shingles, sidings, stone, and hollow tile; and which may be cut, sawed, nailed, glued, sanded, or otherwise manipulated.

Two formulae have been developed which employ the basic constituents of the present invention, each of which may have incorporated therewith any one of a number of fibrous materials. The essential ingredient in the composition is oats, which, by and of itself, is the binder for the fibrous material.

In the preparation of the material it is important that the oats be ground to a fine flour in order that it may be wholly dispersed in liquid. A satisfactory binder is made by cooking the oat flour in water in the proportion of one pound of oats to twenty pounds of water. The mixture of oats and water is cooked until the mixture assumes a consistency like that of hot jelly. A difficulty encountered in the use of this mixture, however, as a binder for commonly used materials is the fact that the mixture sours rapidly after cooling. Moreover, even after the finished product has been compounded and applied, mold spores may develop during the drying period. To prevent the liquid binder from souring, and as a mold retardent, an oil ingredient is added to the mixture of oats and water, either during or after the cooking operation, as a preservative. Sassafras oil or oil of cloves has been found to have excellent preservative properties when added to the mixture of oat flour and water in the proportion of one-half teaspoonful of the oil to the mixture of oats and water above mentioned.

If the product is intended for use as a plaster or stucco, or for wall board and the like, it is preferable that the fibrous material to be used as the base for the plastic composition be finely comminuted. If this is done the product will have a compact texture characterized by its firmness and solidity. On the other hand, if the product is to be used for acoustical purposes or as an insulating material, it is preferable that the base consist of a relatively coarse material and that the final product be of a cellular character.

A preferred material for use as a base for the composition is newspapers. These may be subjected to the action of a comminutor to condition them for mixing with the binding solution. Sander dust, i. e., the residual product which comes from a sanding machine in the form of dust, is also an excellent base material for the composition, although because of the desirable properties inherent in newspaper flour, better results are had when the sander dust and newspaper flour are mixed in proportions of about half and half of each. In the place of newspapers, however, any other fibrous materials may be used, such as asbestos, straw, wood or rag pulp, wood shavings, etc.

In the preparation of one formula, the product of which is intended for use for interior purposes, the oats is ground to a fine flour and the flour stirred into cold water. Heat is thereupon applied to the mixture to bring the temperature of the mixture to 212° F. At some time either before, during or immediately after application of heat, a preservative, such as sassafras oil, is added to the mixture. Thereupon, finely divided newspapers or other fibrous material is mixed into the oat flour solution in sufficient quantity to bring the final product to the desired consistency for application. The fibrous base material may be mixed with the oat flour solution while the latter still is hot, although better results will be had if the solution is first cooled to room temperature. For use as plaster to be applied with a trowel, approximately three pounds of fibrous material is used with a solution consisting of one pound of oats and twenty pounds of water. If a stiffer mixture is desired which can be handled with the hands and molded into various desired shapes, fibrous material is added as found necessary. For use as wall board and the like, or when intended to be cast into shapes, approximately four pounds of fibrous material is used with a solution consisting of one pound of oats and thirty pounds of water.

The second formula is designed to produce a material intended primarily for exterior use, such as in place of stucco, shakes, shingles, and the like. In the preparation of this formula the oats is ground to a fine flour as before, and stirred into a cold solution of magnesium chloride having a density of approximately 10° Baumé. Heat is thereupon applied to the mixture to bring the temperature of the mixture to 212° F. Thereupon, the solution is cooled to room temperature and calcined magnesite is stirred into the solution, the amount of calcined magnesite used being in the proportion of 2½ pounds of calcined magnesite to each one pound of oat flour used in the solution. Thereafter, the selected fibrous material is mixed into the solution in sufficient quantity to bring the final product to the desired consistency for application. If the compound is to be applied with a trowel, approximately three pounds of fibrous material is used with a solution consisting of one pound of oat flour, twenty pounds of magnesium chloride solution, and two and one-half pounds of calcined magnesite. If the mixture is to be handled with the hands and molded or cast into various shapes, fibrous material may be added as found necessary without increasing the liquid content of the binder solution.

It is to be understood that either of these formulae may be varied somewhat, and that each may have mixed therewith a suitable waterproofing or fire-proofing substance, either of these ingredients being added in quantities according to the properties of the ingredients used. As an alternative method of water-proofing or fire-proofing, the desired substances may be applied to the surface of the product.

Having now described my invention and in what manner the same may be used, what I claim as new and desire to protect by Letters Patent is:

The process of compounding a plastic material consisting of pulverizing oats, mixing the pulverized oats in water in the proportion of one pound of oats to twenty pounds of water, heating the mixture of oats and water to 212° F. until the mixture assumes a jelly-like consistency, adding approximately one-sixteenth ounce sassafras oil as a mold retardent, and adding not more than four pounds of fibrous material to bring the product to the desired consistency for application.

MICHAEL J. BATELJA.